United States Patent [19]
Carlisle et al.

[11] Patent Number: 5,418,874
[45] Date of Patent: May 23, 1995

[54] FORCE TRANSFER SYSTEM FOR AN OPTICAL FIBER CONNECTOR

[75] Inventors: Arthur W. Carlisle, Dunwoody; Wayne D. Granger; Jeffrey H. Hicks, both of Lilburn, all of Ga.

[73] Assignee: AT&T Corp., Murray Hill, N.J.

[21] Appl. No.: 184,623

[22] Filed: Jan. 19, 1994

[51] Int. Cl.⁶ ............................................. G02B 6/36
[52] U.S. Cl. ........................................ 385/76; 385/77; 385/78; 385/81; 385/87; 385/139
[58] Field of Search ............ 385/60, 62, 76, 77, 385/78, 81, 84, 87, 139

[56] References Cited

U.S. PATENT DOCUMENTS

| | | | |
|---|---|---|---|
| 4,355,862 | 10/1982 | Kock | 385/81 X |
| 4,435,036 | 3/1984 | Sasakawa | 385/81 X |
| 4,674,833 | 6/1987 | Des Forges et al. | 385/81 X |
| 4,679,895 | 7/1987 | Huber | 385/81 X |
| 4,696,537 | 9/1987 | Bauer et al. | 385/81 |
| 4,728,171 | 3/1988 | Schofield et al. | 385/81 X |
| 4,787,706 | 11/1988 | Cannon, Jr. et al. | 385/76 X |
| 4,812,009 | 3/1989 | Carlisle et al. | 385/76 X |
| 4,998,796 | 3/1991 | Bonanni et al. | 385/83 X |
| 5,107,536 | 4/1992 | Wall | 385/81 |
| 5,142,601 | 8/1992 | Shibata et al. | 385/86 |
| 5,239,602 | 8/1993 | Hunsberger et al. | 385/62 |
| 5,313,540 | 5/1994 | Ueda et al. | 385/78 |

FOREIGN PATENT DOCUMENTS

0086266  11/1982  European Pat. Off. ........ 385/100 X

*Primary Examiner*—Brian Healy
*Attorney, Agent, or Firm*—Michael A. Morra

[57] ABSTRACT

An optical fiber connector includes a wedge for gripping one or more buffered optical fibers. The wedge comprises a body portion having an opening that extends through it from one end to the other through a longitudinal axis of the wedge for receiving the pair of optical fibers contained within a cable. The wedge further includes a pair of flexible cantilevers that extend from one end of the body portion along a direction that is parallel to the longitudinal axis. Each cantilever includes an inner surface that faces the inner surface of the other cantilever, and each inner surface includes an like number of grooves that are parallel to each other and perpendicular to the longitudinal axis of the wedge. The grooves grip the pair of buffered optical fibers when compressed by crimping a surrounding bushing, and thereby restrain the optical fibers from being pulled back into the cable during handling. The cantilevers are symmetrically positioned on opposite sides of a plane which contains the longitudinal axis of the wedge.

15 Claims, 6 Drawing Sheets

FORCE TRANSFER SYSTEM FOR AN OPTICAL FIBER CONNECTOR

TECHNICAL FIELD

This invention relates generally to connectors for terminating optical cables, and more particularly to a connector having an improved design for transferring forces from the cable to the connector.

BACKGROUND OF THE INVENTION

The use of optical fibers in communication systems is growing at an unprecedented rate. Low loss optical fibers which are produced by any of several techniques may be stranded into cables, or enclosed individually in a jacket and used in the transmission of large amounts of information which is typically binary (i.e., on/off pulses). An optical fiber comprises a thin glass fiber which has been processed to confine light along its longitudinal axis, and then enclosed within one or more layers of a protective coating material that cushions the glass fiber against severe bending and protects it from contaminants such as water vapor to preserve its inherently high tensile strength. In some applications, no additional jacketing is applied to the individual fibers; however, in other applications is it necessary to add a buffer material around each coated fiber. In these situations, a layer of nylon or polyvinylchloride, for example, is extruded around the individual optical fibers to form what is known as a "buffered optical fiber." In most interconnection cable applications, one or more of these buffered fibers is combined with strength members of various types and covered with a polymer jacket or sheath.

In optical fiber connectors, particularly duplex connectors which are used for making connections to a pair of optical fibers, it is necessary to provide a force transfer system at the cable-entrance end of the connector to hold strength members of the cable in such a manner that tensile forces on the cable are transferred to the housing of the connector. These tensile forces are also coupled to the optical fiber(s) which reside in the cable and, without proper restraint, will pull the fibers from the connector back into the cable. Such shortening of the fibers inside the connector case can cause high-stress bending where the fiber is joined to a plug assembly thereby causing a decrease in long-term reliability.

A known technique for immobilizing buffered fibers within a duplex optical fiber connector utilizes a cylindrical rubber grommet which is secured within the connector housing. Epoxy is applied to prevent the grommet itself from moving due to exposure to high/low temperature extremes. The grommet includes three openings that are arrayed in a triangular pattern and extend between opposite ends of the grommet along a direction that is parallel to its central axis. Two of the openings are grooved to facilitate gripping the buffered fiber. The remaining opening is smooth and receives a metal pin which, when inserted, causes the grooved openings to compress around the buffered fibers to hold them securely. And while this technique is useful for immobilizing buffered fibers within an optical fiber connector, it is somewhat expensive, it requires careful manual assembly, and adhesive materials must be handled and cured.

What is needed, and what is not supplied by the prior art, is a force transfer system for use within a connector that grips one or more optical fibers in a manner which is cost effective, easy to assemble, and preferably avoids the use of adhesives.

SUMMARY OF THE INVENTION

The foregoing problems are solved by a force transfer system comprising a wedge positioned within a bushing for gripping one or more optical fibers within a connector. The bushing includes a passageway which is shaped to receive the wedge. The wedge includes a body portion having a pair of flexible cantilevers that extend from one end of the body portion and are parallel to each other. Each cantilever includes an inner surface that faces the inner surface of the other cantilever. At least one of the inner surfaces is adapted to grip the optical fiber.

In a preferred embodiment of the invention, the inner surface of each cantilever includes an equal number of grooves that are parallel to each other and perpendicular to the longitudinal axis of the wedge. The cantilevers are symmetrically positioned on opposite sides of a plane which contains the longitudinal axis of the wedge. Each cantilever includes a pair of semicircularly shaped channels at its free end for receiving a pair of buffered optical fibers. The bushing is made from a deformable material which is crimped at one end to apply a force to the cantilevers, thereby causing the cantilevers to move toward each other and grip the buffered optical fibers positioned therebetween.

BRIEF DESCRIPTION OF THE DRAWING

The invention and its mode of operation will be more clearly understood from the following detailed description when read with the appended drawing in which.

DETAILED DESCRIPTION

Figure 1:
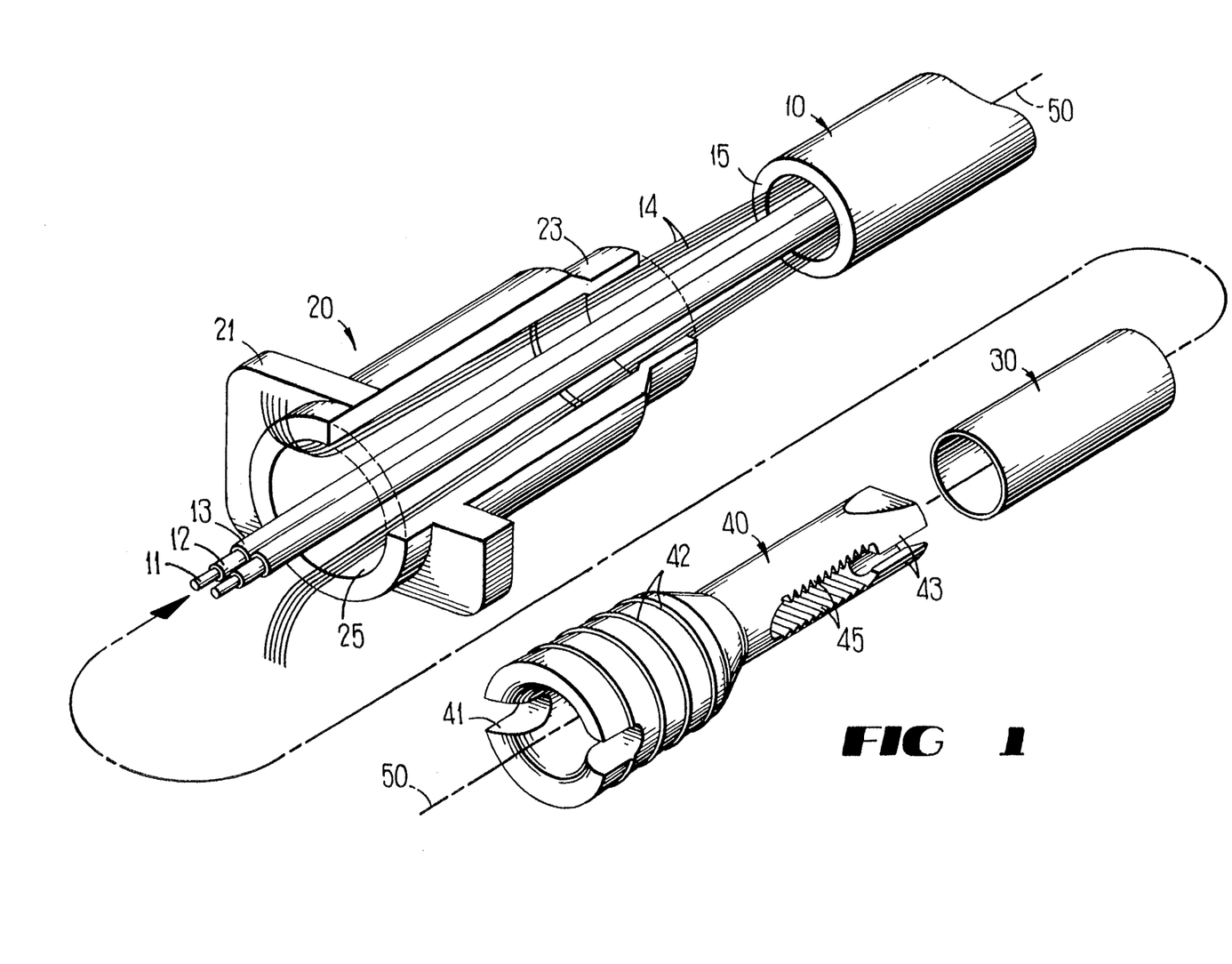
FIG. 1 is an exploded perspective view of an optical fiber connector in accordance with the present invention.

FIG. 1 is an exploded perspective view of a force transfer system for use in an optical fiber connector. In particular, the interaction between significant parts of the force transfer system and optical cable 10 is illustrated. Cable 10 includes two buffered optical fibers 13, each of which comprises a glass fiber 11 enclosed within a coating system 12 and a buffer layer of a plastic material such as polyvinyl chloride (PVC) or nylon. The buffered optical fibers 13 are enclosed in a common plastic jacket 15 and non-metallic strength member system comprising aramid yarn 14 disposed between the optical fibers and the jacket.

Figures 3, 4:
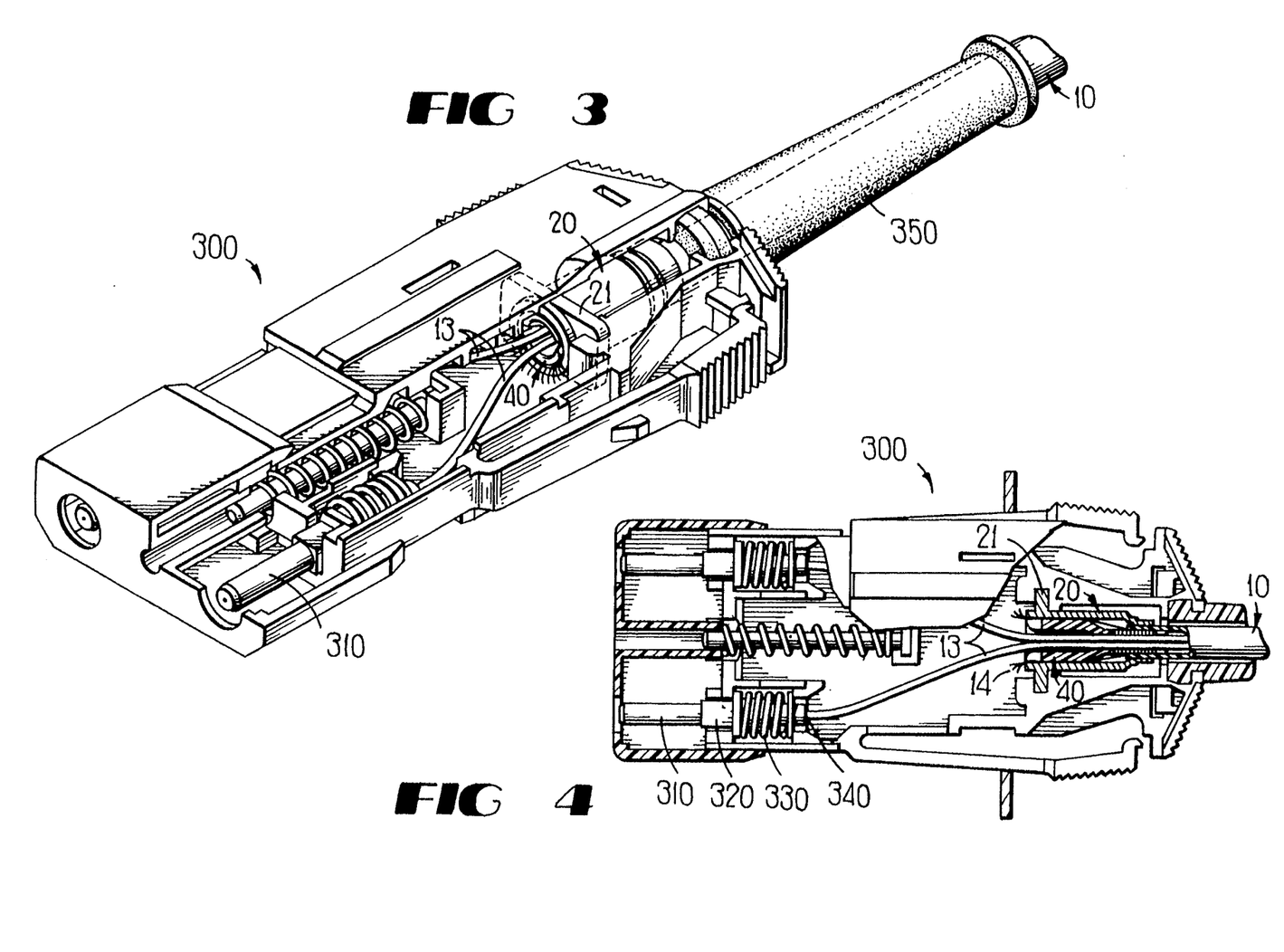
FIG. 3 is a perspective view of a duplex connector in accordance with the invention with portions thereof broken away.
FIG. 4 is a plan view, partially in section, of the duplex connector of FIG. 3.

Bushing 20 is a cylindrically shaped body having a flange 21 at one end thereof which is used for holding the bushing within an optical fiber connector (see FIG. 3). The bushing is, illustratively, die cast from a zinc alloy such as Zamac 5 so that it is sufficiently rigid but still deformable in a crimping operation. Passageway 25 of the bushing 20 is tapered at a 3-degree included angle to cooperate with a wedge 40 of the force transfer system in securing strength member yarn 14 therebetween. A portion of the cable extends into the bushing beyond crimping area 23 with its jacket removed in order to expose strength member 14, and to allow the buffered optical fibers 13 to extend through passageway 25 toward the flanged end of the bushing 20. The wedge 40 has an outer surface which is adapted to mate with the inner surface of passageway 25 of the bushing (i.e., its outer dimensions are substantially the same as the inner dimensions of the passageway). Additionally, the wedge 40 includes a number of concentric ribs 42—42 around its outer surface which help secure the yarn. Strength member yarn 14 is thus captured between the outer surface of wedge 40 and the inner surface of bushing 20, and the bushing is fixed with respect to an associated connector (see FIG. 3) inasmuch as its flange 21 is secured to the connector housing. As a result, portions of the strength member system 14 are held between these surfaces, and any force which is imparted to the cable 10 is transferred by the strength member system to the connector. However, the force transfer system of the present invention also functions to secure the buffered optical fibers 13—13 so that forces imparted to the cable are transferred to the wedge 40. The length of fiber within the connector is critical inasmuch as too much fiber leads to severe bending of the fiber (bend radius is too small), and too little fiber leads to the creation of high stress points at the junction where the optical fiber is joined to a ferrule/barrel assembly.

Wedge 40 includes cantilevers 43—43 (sometimes also referred to as "jaws") that extend from the cable-entrance end of the wedge and are used for grasping buffered optical fibers 13—13 when they are closed. Alignment notches 41—41, located at the other end of the wedge, are used for maintaining the wedge in a predetermined orientation with respect to the bushing. In particular, it is important that crimping forces, applied to jaws 43—43, be approximately orthogonal to a plane that passes between the opening in the jaws, along longitudinal axis 50, and through alignment notches 41—41. This is accomplished by using a tool (not shown) which includes pins that engage notches 41—41 during the insertion of wedge 40 into bushing 20. The tool is oriented so that the aforementioned plane is parallel to the top surface of flange 21 as seen in FIG. 1. Accordingly, forces applied to crimping region 23 in a direction which is orthogonal to the top surface of flange 21, will be properly aligned to close jaws 43 onto the buffered optical fibers 13—13. The inner surface of each cantilever 43 includes a number of spaced-apart grooves 45 which are parallel to each other, but perpendicular to the longitudinal axis 50. A thin-walled tube (sleeve 30) is placed around jaws 43 after the buffered fibers have been inserted between the jaws. The sleeve is made from a heat-shrinkable plastic material, and functions to preclude the strength members 14 from interfering with the buffered optical fibers during a subsequent crimping operation. Assembling the wedge 40 and bushing 20 to the cable 10 will be described more clearly when reference is made to FIG. 2A-2C. And although crimping is a preferred technique for bringing the jaws into engagement with the optical fibers, it is clearly possible to shape the interior of the bushing with a camming surface such that the jaws close as the wedge advances into the bushing.

Figure 2A:
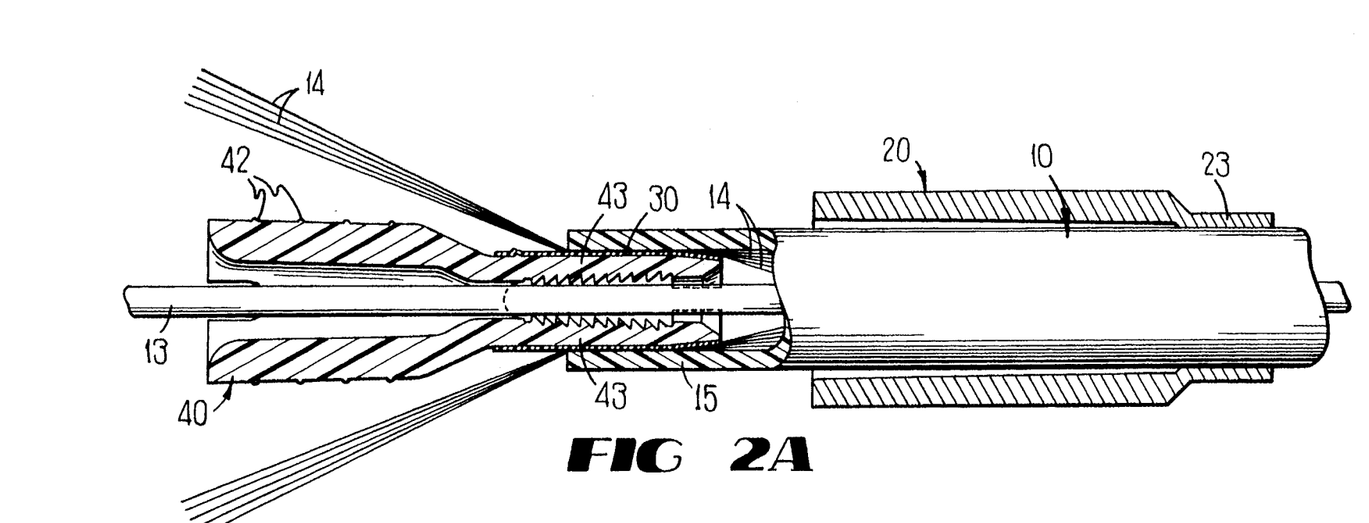
FIG. 2A is a side elevation view, in cross section, of the optical fiber connector showing the position of cooperating components before closure of a wedge onto an optical fiber.
Figure 2B:
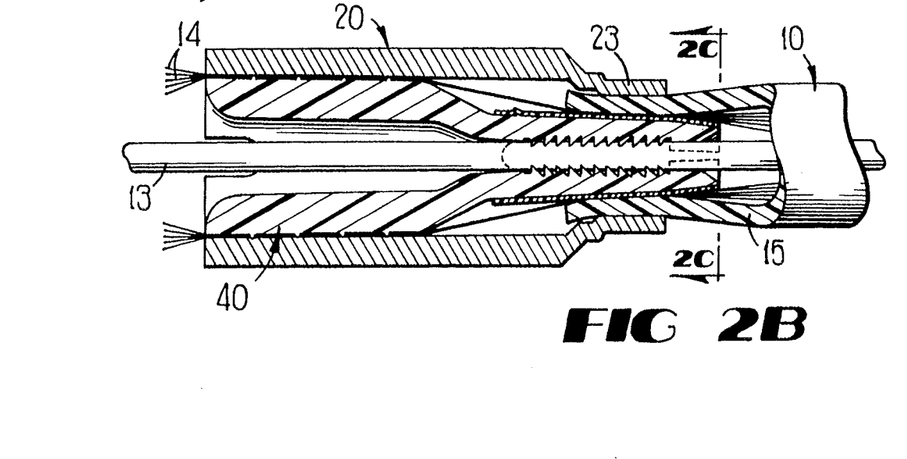
FIG. 2B is a side elevation view, in cross section, of the optical fiber connector showing the position of cooperating components after closure of the wedge onto the optical fiber.

Cable 10, including outer jacket 15, is inserted through passageway 25 of bushing 20. Thereafter, an end portion of the outer jacket is removed to expose a pair of buffered optical fibers surrounded by nonmetallic, filamentary strength members 14. The strength members are pulled back so the buffered optical fibers 13—13 can be inserted through sleeve 30 and jaws 43—43 of the wedge 40 along their common longitudinal axis 50. Sleeve 30, which has been previously installed around jaws 43—43, is now heated so that it will shrink and thereby seal the jaws to preclude any unwanted material (e.g., strength members 14) from entering between the jaws. FIG. 2A shows the assembly described thus far. At this point, the teeth 45 of jaws 43—43 barely touch the buffered optical fibers 13. Note that the teeth are mirror images of each other, so that when they are pressed together there is equal pressure on opposite sides of each optical fiber. Accordingly, no forces can be applied that would tend to create microbends in the optical fiber. Strength members 14 circumferentially surround wedge 40, and when the wedge is pressed into bushing 20, its ridges 42 function to capture them. When the assembly of bushing, wedge and cable are carried out, the buffered fibers feed through the wedge and its jaws, the strength members are trapped between the wedge and the tapered inner surface of the bushing, and the outer cable jacket is between the jaws and the necked-down end of the bushing. At this point, the end 23 of the bushing 20 is crimped. This action transfers a deforming force through the cable jacket 15 to the cantilevers 43—43 of the wedge. The grooved cantilevers are pressed into the plastic of the buffered fiber to provide a secure engagement. The crimp size is selected to assure sufficient buffer penetration by the grooves without damage to the optical fiber. FIG. 2B shows the wedge fully positioned within the bushing after a crimping force has been applied to crimping surface 23 of the bushing.

Figure 2C:
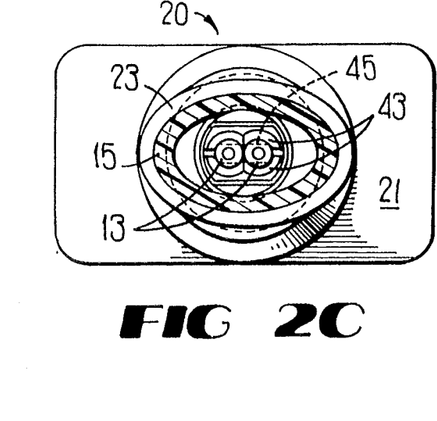
FIG. 2C is an end view of FIG. 2B showing a pair of buffered optical fibers being held within the jaws of the wedge.

The teeth 45 each have a cross section of a buttress thread which precludes the buffered fiber, captured therebetween, from being pulled back into the cable 10 during subsequent handling. The crimping operation causes the teeth 45 to deform the buffer material surrounding the optical fiber without harming the optical fiber itself. This is illustrated more clearly in the cross sectional view of FIG. 2C which shows (via a dotted line) that although the teeth 45 engage the buffered fiber 13, they do not deform the glass fiber itself. Note that the coating is stripped from optical fiber 11 before it is subsequently installed in a ferrule. In a preferred embodiment of the invention, wedge 40 is molded from PEI (Polyetherimide) material which is 30% glass filled and annealed to provide optimum performance when gripping buffered fibers—particularly optical fibers using a nylon buffer material. However, other materials such as zinc may also be used for the wedge. FIG. 2C also shows flange 21 which is used in a duplex connector, as described below, for transferring forces from the cable to the connector.

FIG. 3 and 4 respectively disclose perspective and top views of a duplex connector in accordance with the invention whose general structure and operation are more completely described in U.S. Pat. No. 4,787,706 which is hereby incorporated by reference. However, the duplex connector disclosed in the above-referenced patent does not include any apparatus for transferring forces from either of the buffered fibers contained therein to the connector housing other than a connection between the fiber 13 and the barrel 320—a potentially a high-stress point corresponding to connection 340 shown in FIG. 4. The present invention avoids such stress by precluding movement of the buffered fiber within the duplex connector in a novel manner. Consider the relevant components within duplex connector 300 to more fully understand its operation. Each buffered fiber 13 is mechanically connected (see junction 340) to a plug assembly comprising ferrule 310 and barrel 320. The barrel includes a cavity which receives and holds the ferrule. An optical fiber extends through the central axis of the plug assembly and guides lightwaves used for communicating information. So that the lightwaves can be efficiently connected to another optical device (not shown), the plug assembly is pressed against the optical device or the like by spring 330 which provides a controlled force in the appropriate direction.

Figure 9:
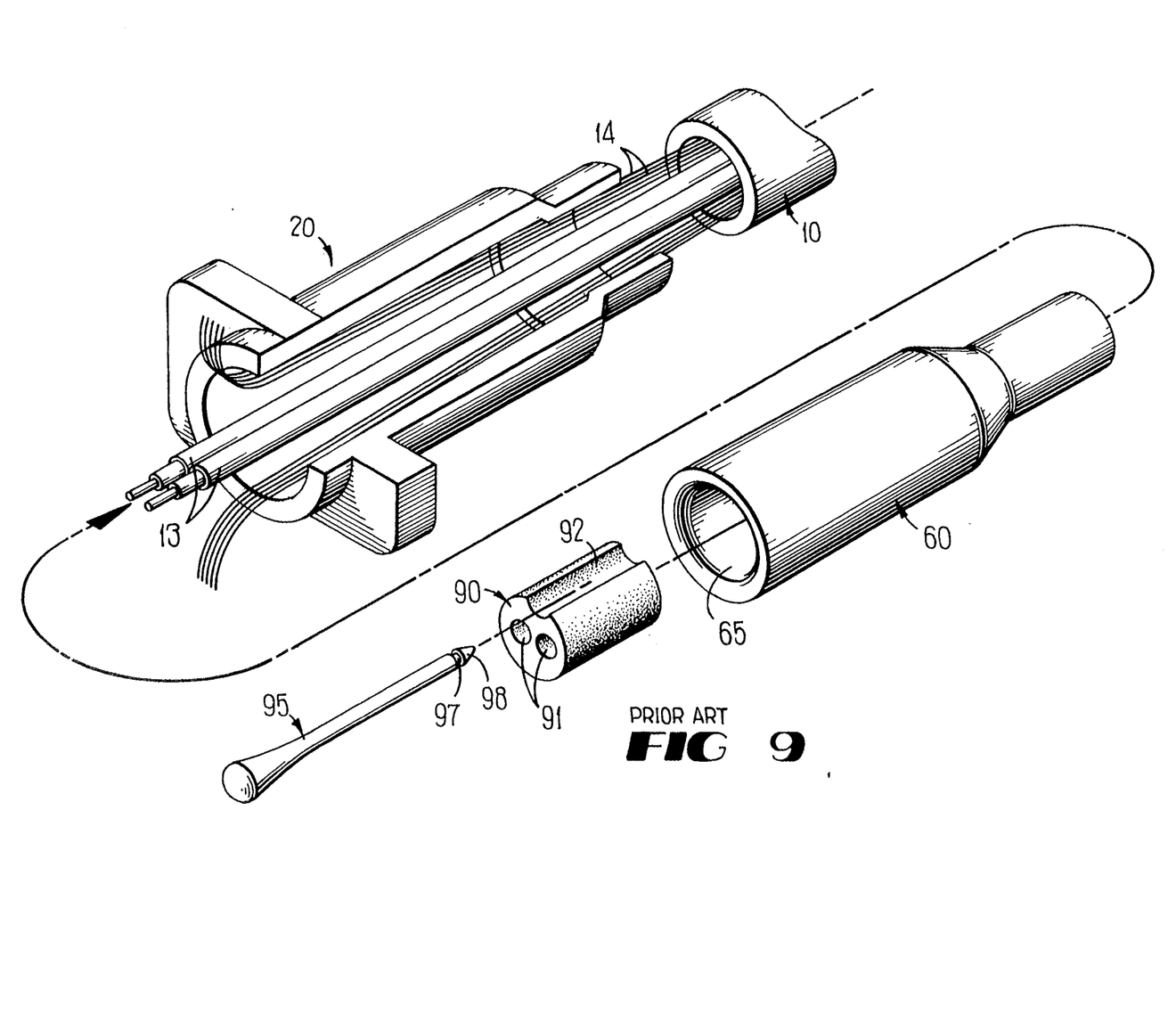
FIG. 9 is an exploded perspective view of a prior art duplex connector.

Reference is briefly made to FIG. 9 which discloses a known force transfer system used in prior art duplex connectors. In particular, the transfer of force from the buffered fibers to the duplex connector is via grommet 90, wedge 60 and bushing 20. In this design, buffered fibers 13—13 are threaded through openings 91—91 in grommet 90, an adhesive material (e.g., epoxy) is applied to the grommet, and the grommet is pressed into longitudinally extending passageway 65 of wedge 60. Openings 91—91 are grooved to facilitate gripping the buffered fibers. Thereafter, a metal pin 95 is inserted into a longitudinally extending groove 92 along the outer surface of the grommet which causes the openings 91—91 to compress around the buffered fibers to hold them securely. The pin 95 includes features 97, 98 which facilitate its insertion into groove 92 but hinder its removal. Since the pin is slightly larger than the groove, and since the grommet is made from a deformable material, such as rubber, insertion of the pin into the groove compresses the size of openings 91—91 to capture the buffered fibers therein.

Returning now to FIG. 3 and 4, an improved force transfer system is shown within duplex connector 300. Bushing 20 surrounds wedge 40 and captures strength members 14 therebetween. Flange 21 of the bushing cooperates with mating recesses molded into the connector to fix their relative positions. Any forces transferred to bushing 20 from the cable 10 are subsequently transferred, via flange 21, to connector 300. When cable 10 is pulled, for example, not only do its strength members 14 transfer a portion of the pulling force to the bushing, but so do fibers 13—13 which are clamped between the jaws of bushing (see FIG. 2B). Use of this novel force transfer system not only reduces the number of components needed to assemble a duplex connector, but it also eliminates the labor-intensive step of threading optical fibers through a grommet. And finally, strain-relief boot 350 not only transfers a small portion of the pulling force from the cable 10 but, more importantly, it enables the cable to withstand repeated bends after interconnection with an optical device (possibly another cable) without undue stress being imparted to the optical fiber. A suitable material for the boot is Santoprene® elastomer—a somewhat rigid thermoplastic which is commercially available from Monsanto Chemical Company.

Figure 5:
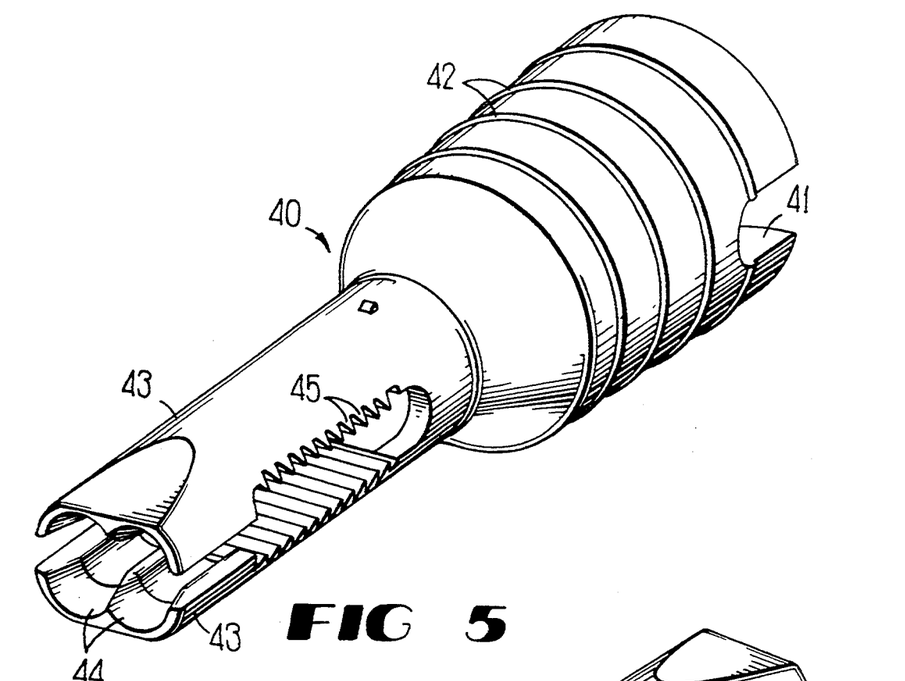
FIG. 5 is a perspective view of an embodiment of the wedge of the present invention as viewed from the end having cantilevers with grooves for gripping a pair of optical fibers.
Figure 6:
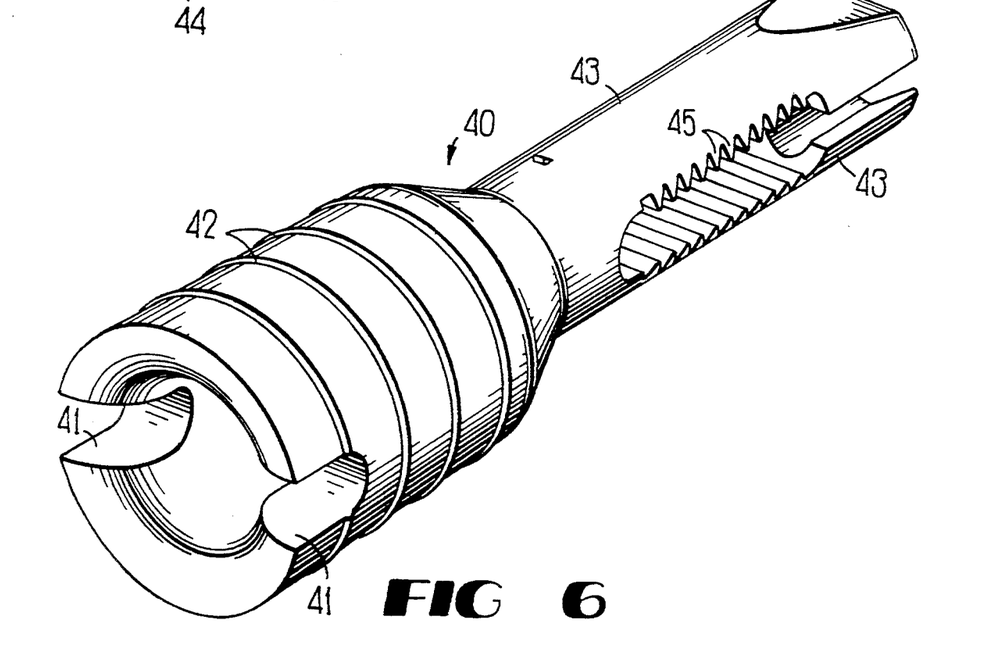
FIG. 6 is a perspective view of the embodiment of the wedge shown in FIG. 5 viewed from the end opposite the cantilevers.

FIG. 5 is a perspective view of an embodiment of the wedge of the present invention as viewed from the end having cantilevers with grooves for gripping a pair of optical fibers. Note the semicircularly shaped channels 44—44 at one end of wedge 40 that hold the buffered fibers in a fixed relative position with respect to each other. These channels prevent the fibers from being moved to a different, and possibly disadvantageous, position during crimping. FIG. 6 shows a perspective view of the embodiment of the wedge shown in FIG. 5 viewed from the end opposite the cantilevers. Although not fully apparent in these FIGS., the outside surface of wedge 40 is tapered at about a 3-degree angle to enhance its "wedging" function. The circumference of the wedge is slightly greater in the region of the alignment notches 41 than in the region which is closer to the cantilevers 43—13.

Figure 7:
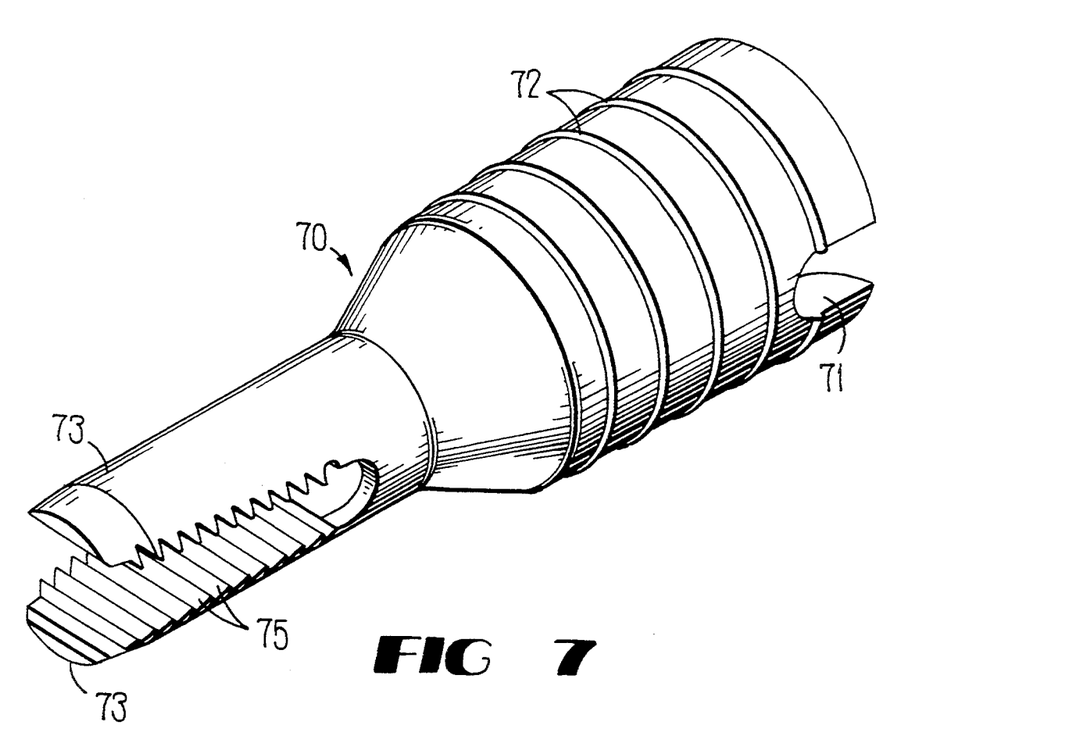
FIG. 7 is a perspective view of a second embodiment of the wedge of the present invention as viewed from the end having cantilevers with grooves for gripping an optical fiber(s)

FIG. 7 is a perspective view of a second embodiment of a wedge 70 in accordance with the present invention. This particular wedge design includes alignment notches 71, circumferential ribs 72 and grooves 75 which operate in the same manner as their functional counterparts shown in FIG. 5 and 6. However, this design is slightly different in that the cantilevers 73 do not include semicircularly shaped channels for holding the buffered fibers in a fixed relative position with respect to each other. And while such channels are advantageous, the design of FIG. 7 provides most of the benefits of the invention.

Figure 8:
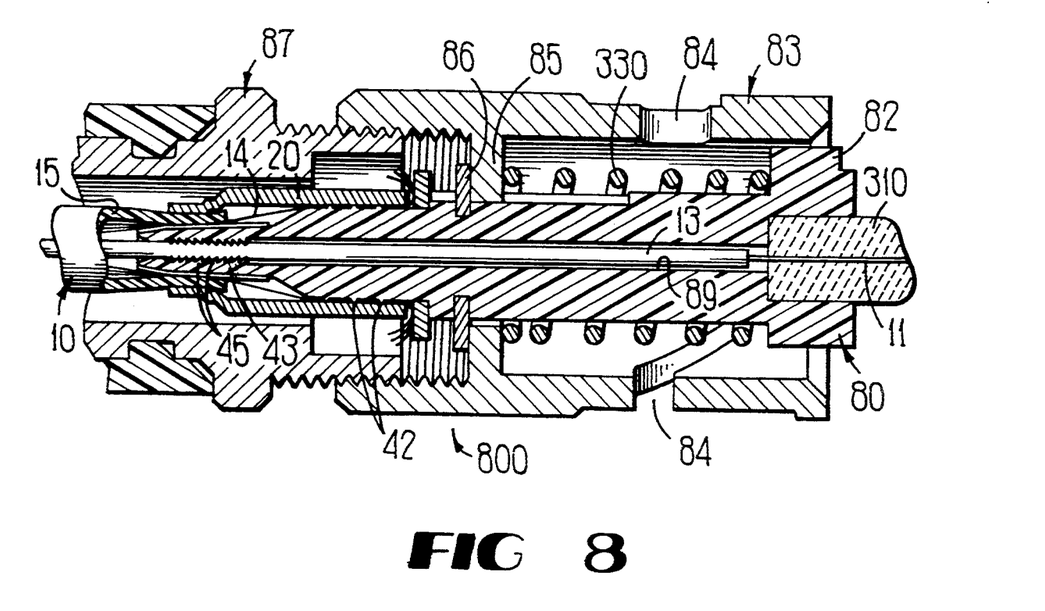
FIG. 8 is a side elevation view, in cross section, of a simplex connector in accordance with the present invention.

FIG. 8 is a side elevation view, in cross section, of a simplex connector 800 in accordance with the present invention. The device shown is an ST® connector which is used to terminate a cable 10 having a single optical fiber—"ST" being a registered trademark of AT&T. This particular connector includes a plug assembly comprising ferrule 310 and barrel 80. The connector further comprises spring 330, cap 83, and cap extender 87. Ferrule 310 is a ceramic or glass cylinder which is adapted to receive a glass fiber 11 whose protective coating has been removed into an axially disposed opening that extends between opposite ends thereof. The ferrule then fits into a cavity at one end of barrel 80 which is shaped to receive it. The barrel may be a machined or molded part, and may be made from metal or plastic material, and tile plug assembly is urged toward the plug end of cap 83 by compression spring 330 so that a when a pair of ferrules are butted together in a coupling sleeve, one or both of the ferrules is moved along its longitudinal axis during the connection process. As shown, barrel 80 includes a bore 89 through its longitudinal axis which holds the buffered fiber 13 therein. The connector 800 may be connected to a coupling apparatus (not shown) by so-called bayonet motion in which the connector is inserted with linear motion into the coupling apparatus and turned to cause projecting pins of the coupling apparatus to be moved along camming slots 84—84 of the cap, and to cause a key 82 of the connector to become disposed in a slot of the coupling apparatus. Cap extender 87 includes an external threaded portion which is turned into the threaded entrance of the cap anti secured thereto. The extender 87 is bonded to the cap 83 after it has been turned fully thereinto.

Compression spring 330 is disposed about a portion of the barrel 80 between, and in engagement with, lip 85 and an enlarged end portion of the barrel. As a result of this arrangement, the spring 330 biases the barrel 80 outwardly from the cap 83 while a retaining clip 86 holds the plug assembly within the cap. Barrel 80 includes two cantilevers 43 that are disposed at the cable-entrance end thereof. Each cantilever includes a plurality of grooves 45 that are parallel to each other and are used to firmly hold buffered fiber 13. By using grooved cantilevers it is possible to eliminate the need for adhesives, such as epoxy, within the bore 89 of barrel 80—advantageously avoiding the labor and mess associated with handling such materials.

At the fiber-entrance end of the barrel 80, externally disposed circumferential ribs 42 are provided for the purpose of cooperating with a bushing 20 to capture the yarn-like strength members 14 that reside within cable 10. The bushing 20 is crimped in the region of cantilevers 43 thereby causing the grooves (teeth) of the cantilevers to close onto the buffered fiber. In the embodiment of FIG. 8, the fiber-entrance end of barrel 80 has the functionality of the previously discussed wedge incorporated therein to form a force transfer system that not only transfers force from the strength members to the connector, but also from the buffered fiber to the connector.

Although a particular embodiment of the present invention has been shown and described, it is understood that various modifications are possible within the spirit and scope of the invention. These modifications include, but are not limited to, the use of other materials in the construction of the wedge and bushing, the use of the present invention in devices other than optical connectors, and the use of techniques other than crimping to bring the cantilevers onto engagement with the optical fiber(s).

We claim:

1. A force transfer system comprising a wedge disposed within a bushing for gripping one or more optical fibers, the bushing having an interior passageway which is shaped to receive the wedge; the wedge including a body portion having a pair of flexible cantilevers that are parallel to each other and extend from one end of the body portion, each cantilever having an inner surface which faces the inner surface of the other cantilever, the inner surfaces of the cantilevers including a plurality of grooves that are parallel to each other and perpendicular to a central axis of the wedge.

2. The force transfer system of claim 1 wherein the bushing and the wedge are generally cylindrical shapes whose central axes are coincident when the wedge is disposed within the bushing.

3. The force transfer system of claim 2 wherein the interior passageway of the bushing and an exterior surface of the body portion of the wedge are tapered at substantially the same angle in the direction of the central axis.

4. A connector for terminating a cable containing a first optical fiber surrounded by a buffer material, the connector including a first plug assembly which comprises (i) a cylindrically shaped ferrule having a passageway through a central axis thereof for receiving a first optical fiber, (ii) a barrel member, also having a passageway through a central axis thereof for receiving the first optical fiber, and (iii) a spring member disposed about the barrel member CHARACTERIZED BY:

a wedge including a pair of flexible cantilevers that extend from a body portion thereof along its longitudinal axis, each cantilever comprising an inner surface which generally faces the inner surface of the other cantilever, at least one of said inner surfaces including one or more grooves for gripping the first optical fiber; and means engaging the outside surfaces of said cantilevers such that a force is imparted on the cantilevers in a direction which urges them together; whereby the first optical fiber is held within the connector by the wedge, member.

5. The connector of claim 4 wherein the means engaging the cantilevers comprises a cylindrical member which surrounds said cantilevers and is adapted to be crimped at one end thereof.

6. The connector of claim 4 wherein the inner surface of each cantilever includes an equal number of grooves that are parallel to each other but perpendicular to the longitudinal axis of the wedge.

7. The connector of claim 6 wherein the grooves are positioned along the inner surfaces of the cantilevers as mirror images of each other; whereby microbending of the optical fiber is avoided.

8. The connector of claim 4 wherein the wedge is made from a glass-filled polyetherimide material.

9. The connector of claim 8 wherein glass comprises approximately 30% of the wedge.

10. The connector of claim 4 further including a second plug assembly which comprises (i) a cylindrically shaped ferrule having a passageway through a central axis thereof for receiving a second optical fiber of the cable, (ii) a barrel member, also having a passageway through a central axis thereof for receiving the second optical fiber, and (iii) a spring member disposed about the barrel member.

11. The connector of claim 10 wherein the wedge is adapted to receive said first and second optical fibers, the free end of each cantilever including a pair of semicircularly shaped channels that cooperate with the semicircularly shaped channels of the other cantilever to restrain lateral movement of the optical fiber pair.

12. A duplex optical fiber connector for terminating two optical fibers of a cable and being adapted to be joined to another connector, said duplex connector comprising:

a housing which includes a cable-entrance end and a plug end;

force transfer means positioned adjacent to the cable-entrance end of the housing through which the optical fibers extend for transferring tensile force applied to the optical fibers to the housing, said force transfer means including a wedge member through which the optical fibers extend and which is effectively linked to the housing for the purpose of communicating tensile forces thereto, the wedge member comprising a body portion and a pair of flexible cantilevers extending from one end thereof that are parallel to a longitudinal axis of the wedge and are positioned on diametrically opposite sides of said axis, said force transfer means further including means for applying an orthogonal force to the flexible cantilevers which causes them to move together and capture the optical fibers therebetween; and a plug assembly positioned adjacent to the plug end of the housing and adapted to be associated with each of the optical fibers, each plug assembly including a ferrule for terminating one of the optical fibers of the cable.

13. A simplex optical fiber connector for terminating an optical fiber of a cable and being adapted to be joined to another connector, said simplex connector comprising:

a housing which includes a cable-entrance end and a plug end;

force transfer means positioned adjacent to the cable-entrance end of the housing through which the optical fiber extends for transferring tensile force from the optical fiber to the housing, said force transfer means including a wedge member through which the optical fiber extends and which is effectively linked to the housing for the purpose of communicating tensile forces thereto, the wedge member comprising a body portion and a pair of flexible cantilevers extending from one end thereof that are parallel to a longitudinal axis of the wedge and are positioned on diametrically opposite sides of said axis, said force transfer means further including means for applying an orthogonal force to the flexible cantilevers which causes them to move together and capture the optical fiber therebetween; and a plug assembly positioned adjacent to the plug end of the housing and adapted to be associated with the optical fiber, the plug assembly including a ferrule for terminating the optical fiber and a barrel member for holding the ferrule.

14. In combination, an optical fiber cable and a connector for same, the optical fiber cable comprising:

a first optical fiber surrounded by a plurality of non-metallic filamentary strength members, said strength members extending in the same longitudinal direction as the first optical fiber and being enclosed within a dielectric outer jacket;

the connector comprising:

a housing which includes a cable-entrance end and a plug end;

force transfer means positioned adjacent to the cable-entrance end of the housing through which the first optical fiber extends for transferring tensile force from the first optical fiber to the housing, said force transfer means including a wedge member through which the optical fiber extends and which is effectively linked to the housing for the purpose of communicating tensile forces thereto, the wedge member comprising a body portion and a pair of flexible cantilevers extending from one end thereof that are parallel to a longitudinal axis of the wedge and are positioned on diametrically opposite sides of said axis, said force transfer means further including means for applying an orthogonal force to the flexible cantilevers which causes them to move together and capture the optical fiber therebetween; and a first plug assembly positioned adjacent to the plug end of the housing and adapted to be associated with the optical fiber, the first plug assembly including a first ferrule for terminating the first optical fiber and a first barrel member for holding the first ferrule.

15. The combination of claim 14 wherein the housing further includes a second plug assembly positioned adjacent to the plug end of the housing and adapted to be associated with a second optical fiber of the cable, the second plug assembly including a second ferrule for terminating the second optical fiber and a second barrel member for holding the second ferrule.

* * * * *